United States Patent
Nakagawa et al.

Patent Number: 5,653,912
Date of Patent: Aug. 5, 1997

[54] LIQUID CRYSTAL COMPOSITIONS

[75] Inventors: Etsuo Nakagawa; Shinichi Sawada, both of Chibaken, Japan

[73] Assignee: Chisso Corporation, Osaka, Japan

[21] Appl. No.: 435,614

[22] Filed: May 5, 1995

[30] Foreign Application Priority Data

May 6, 1994 [JP] Japan .................... 6-117629

[51] Int. Cl.$^6$ ............... C09K 19/52; C09K 19/34; C09K 19/30; G02F 1/13

[52] U.S. Cl. ............... 252/299.01; 252/299.61; 252/299.63; 252/299.66; 252/299.67; 349/182

[58] Field of Search .............. 252/299.01, 299.61, 252/299.63, 299.64, 299.65, 299.66, 299.67; 359/103

[56] References Cited

U.S. PATENT DOCUMENTS

| | | | |
|---|---|---|---|
| 4,439,340 | 3/1984 | Kojima et al. | 252/299.63 |
| 4,507,222 | 3/1985 | Inoue et al. | 252/299.63 |
| 4,536,321 | 8/1985 | Sugimori et al. | 252/299.63 |
| 4,622,164 | 11/1986 | Eidenschik et al. | 252/299.63 |
| 4,661,283 | 4/1987 | Sugimori et al. | 252/299.63 |
| 4,778,620 | 10/1988 | Goto et al. | 252/299.63 |

FOREIGN PATENT DOCUMENTS

| | | |
|---|---|---|
| 0155792 | 9/1985 | European Pat. Off. |
| 0255700 | 2/1988 | European Pat. Off. |
| 0316186 | 5/1989 | European Pat. Off. |
| 0393490 | 10/1990 | European Pat. Off. |
| 0393443 | 10/1990 | European Pat. Off. |
| 0481293 | 4/1992 | European Pat. Off. |
| 4028988 | 3/1992 | Germany |

*Primary Examiner*—Shean C. Wu
*Attorney, Agent, or Firm*—Wenderoth, Lind & Ponack

[57] ABSTRACT

Disclosed are liquid crystal compositions each comprising a first component (formula (I)), a second component (formula (II)), a third component (formulae (III) to (V)) and a fourth component (formulae (VI) and (VII)):

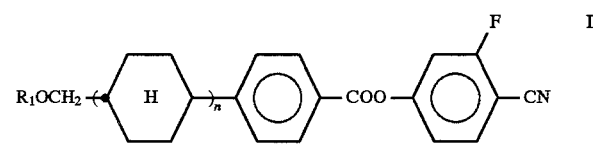

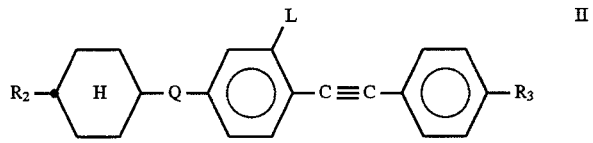

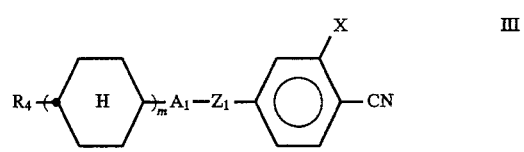

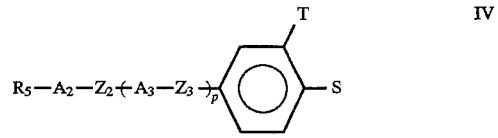

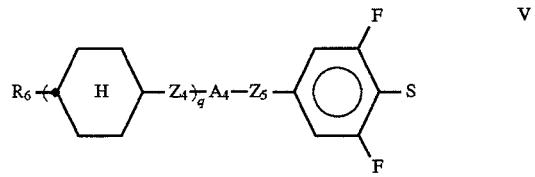

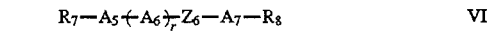

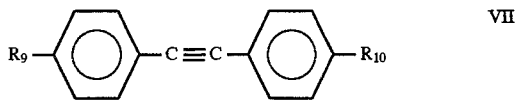

$R_1$, $R_2$, $R_3$, $R_4$, $R_5$, $R_6$, $R_7$ and $R_9$ each are a $C_{1-8}$ alkyl; n, m, p, q and r each are 0 or 1; $R_8$ and $R_{10}$ each are a $C_{1-8}$ alkyl or alkoxy, or a $C_{2-8}$ alkoxymethyl; $A_1$ is a 1,5-cyclohexylene, 1,4-phenylene or 1,3-dioxane-2,5-diyl; $A_2$ and $A_5$ each are a 1,4-cyclohexylene, 1,4-phenylene or pyrimidine-2,5-diyl; $A_3$, $A_4$, $A_6$ and $A_7$ each are a 1,4-cyclohexylene or 1,4-phenylene; $Z_1$, $Z_3$ and $Z_6$ each are —COO— or a single bond; $Z_2$ and $Z_4$ each are —CH$_2$—CH$_2$—, —CH═CH— or a single bond; Q and $Z_5$ each are —CH$_2$CH$_2$— or a single bond; L, X and T each are F or H; S is F, Cl or CF$_3$. Also provided are electro-optical display devices containing any of these compositions, which have rapid response and can be driven even at a low voltage. The temperature-dependence of the driving voltage for the devices is reduced.

13 Claims, No Drawings

LIQUID CRYSTAL COMPOSITIONS

FIELD OF THE INVENTION

The present invention relates to liquid crystal compositions for liquid crystal displays and, more precisely, to liquid crystal compositions to be used in display devices for a TN (twisted nematic) mode or an STN (super-twisted nematic) mode and also to liquid crystal display devices employing the compositions.

BACKGROUND OF THE INVENTION

At present, display devices employing liquid crystals are widely utilized in watches, electronic calculators, etc. For driving such liquid crystal display devices, the optical anisotropy and the dielectric anisotropy of liquid crystal substances are utilized in the devices. A liquid crystal phase includes a nematic liquid crystal phase, a smectic liquid crystal phase and a cholesteric liquid crystal phase. Of these liquid crystal phases, a nematic phase is employed most popularly in practical liquid crystal display devices. Display modes for liquid crystal displays include a TN (twisted nematic) mode, an STN (super-twisted nematic) mode, DS (dynamic scattering) mode, a guest-host mode, an ECB (electrically controlled birefringence) mode, etc.

Many liquid crystal compounds are known and include those which are still being studied at present. However, no liquid crystal substance capable of being singly filled in a liquid crystal cell to be used by itself is known presently. This is for the following reasons. It is desirable that liquid crystal substances for display devices have a broadest possible mesomorphic temperature range including room temperature at which display devices are used most frequently. It is also desirable that they must be sufficiently stable against the environmental influences relating to them and must have satisfactory physical properties required for display materials. However, no single liquid crystal substance satisfying these conditions by itself is known.

At present, therefore, liquid crystal compositions comprising plural liquid crystal substances, and optionally, along with non-liquid-crystalline substances are prepared and put to practical use as display materials.

It is necessary that such liquid crystal compositions are chemically stable against water, light, heat, air, etc. that are Generally present in the surroundings in which they are used and also against electric and magnetic fields. Further, the liquid crystal compounds to be mixed into the compositions are required to be individually, mutually and chemically stable in the surroundings in which they are used.

Liquid crystal compositions must have suitable optical anisotropy and dielectric anisotropy, and also a suitable viscosity and a suitable mesomorphic temperature range, in accordance with the display mode and the devices in which they are used.

The most popular display modes which are generally employed at present, include a TN (twisted nematic) mode having a twist angle of 90 degrees and an STN (super-twisted nematic) mode having a twist angle being between 180 degrees and 270 degrees, in which modes the optical activity and the birefringent property of the liquid crystals are utilized, respectively. Regarding recent liquid crystal display devices for these systems the matters of the greatest importance are the following:

(1) To realize low driving voltage and low power consumption;
(2) To minimize the temperature-dependence of the electrooptical characteristics of liquid crystal materials; and
(3) To realize high-speed response, etc.

In order to be satisfactory in these matters, liquid crystal materials to be used in liquid crystal display devices are required to have satisfactory characteristics with respect to the threshold voltage, the optical anisotropy, the viscosity, etc. The lowering of the threshold voltage makes it possible to realize low driving voltage and low power consumption, while the reduction in the temperature-dependence of the threshold voltage makes it possible to solve the problem of the insufficient contrast in the practical temperature range at which the display device is used and also to eliminate display failure such as cross-talk.

In display devices, it is necessary to define the product ($\Delta n \times d$) of the optical anisotropy ($\Delta n$) of the liquid crystal material to be filled in a cell and the thickness (d μm) of the cell at a pre-determined value, depending on the display mode to be applied to these devices, etc. In this case, where a liquid crystal material having a large $\Delta n$ is used, the value of d may be small.

The response time ($\tau$) in a display device is proportional to the viscosity ($\eta$) of the liquid crystal material to be placed in the device and is proportional to the square of the thickness (d) of the cell containing the material. Therefore, if the values of d and $\eta$ are small, $\tau$ is noticeably reduced, thereby realizing rapid response. For these reasons, it is much desired that liquid crystal compositions are obtained that have a reduced threshold voltage with reduced temperature-dependence and having suitably elevated optical anisotropy and also a low viscosity.

SUMMARY OF THE INVENTION

An object of the present invention is to provide liquid crystal materials for liquid crystal display devices capable of being driven at a low voltage while the driving voltage is hardly influenced by the ambient temperature. Another object of the present invention is to provide liquid crystal compositions having a suitably elevated optical anisotropy and a low viscosity.

Accordingly, the present invention provides liquid crystal compositions each comprising a first component consisting of at least one compound selected from compounds of the following general formula (I), a second component consisting of at least one compound selected from compounds of the following general formula (II), a third component consisting of at least one compound selected from compounds of the following general formulae (III) to (V), and a fourth component consisting of at least one compound selected from compounds of the following general formulae (VI) and (VII).

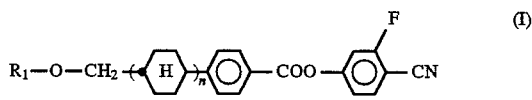

wherein $R_1$ represents an alkyl group having 1 to 8 carbon atoms; n represents 0 or 1.

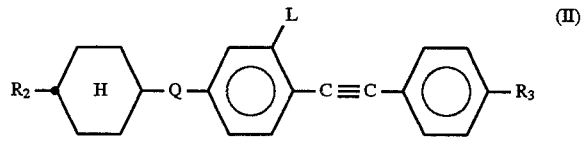

wherein $R_2$ and $R_3$ each independently represent an alkyl group having 1 to 8 carbon atoms; L represents F or H; Q represents —CH$_2$CH$_2$— or a single bond.

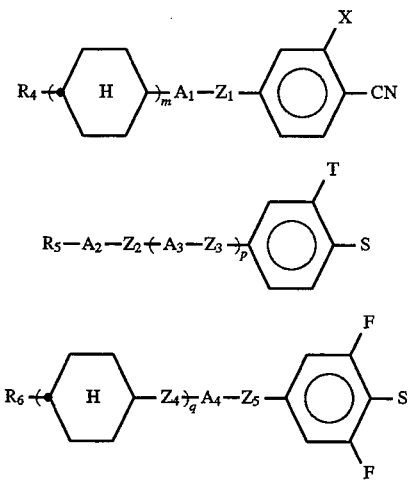

wherein in formula (III), R$_4$ represents an alkyl group having 1 to 8 carbon atoms, in which one CH$_2$ group may be substituted by an oxygen atom or —CH=CH—; m represents 0 or 1; A$_1$ represents a trans-1,4-cyclohexylene, 1,4-phenylene or trans-1,3-dioxan-2,5-diyl group; Z$_1$ represents —COO— or a single bond; X represents F or H, provided that when Z$_1$ is —COO—, then X is H;

in formula (IV), R$_5$ represents an alkyl group having 1 to 8 carbon atoms; p represents 0 or 1; A$_2$ represents a trans-1,4-cyclohexylene, 1,4-phenylene or pyrimidin-2,5-diyl group; A$_3$ represents a trans-1,4-cyclohexylene or 1,4-phenylene group; Z$_2$ represents —CH$_2$CH$_2$—, —CH=CH— or a single bond; Z$_3$ represents —COO— or a single bond; T represents F or H; S represents F or Cl;

in formula (V), R$_6$ represents an alkyl group having 1 to 8 carbon atoms; q represents 0 or 1; A$_4$ represents a trans-1,4-cyclohexylene or 1,4-phenylene group; Z$_4$ represents —CH$_2$CH$_2$—, —CH=CH— or a single bond; Z$_5$ represents —CH$_2$CH$_2$— or a single bond; S represents F or Cl.

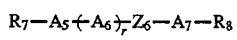

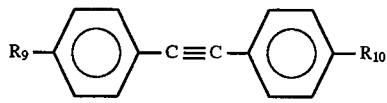

wherein in formula (VI), R$_7$ represents an alkyl group having 1 to 8 carbon atoms; R$_8$ represents an alkyl or alkoxy group having 1 to 8 carbon atoms or an alkoxymethyl group having 2 to 8 carbon atoms; r represents 0 or 1; A$_5$ represents a trans-1,4-cyclohexylene, 1,4-phenylene or pyrimidin-2,5-diyl group; A$_6$ and A$_7$ each independently represent a trans-1,4-cyclohexylene or 1,4-phenylene group; Z$_6$ represents —COO— or a single bond;

in formula (VII), R$_9$ represents an alkyl group having 1 to 8 carbon atoms; R$_{10}$ represents an alkyl or alkoxy group having 1 to 8 carbon atoms.

DETAILED DESCRIPTION OF THE INVENTION

In the liquid crystal composition of the present invention where A$_1$ in formula (III) for the third component is a trans-1,3-dioxan-2,5-diyl group or where A$_2$ in formula (IV) for the same is a pyrimidin-2,5-diyl group, the A$_1$ or A$_2$ is preferably oriented as shown below.

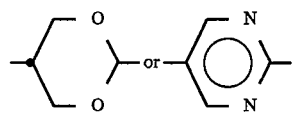

In the liquid crystal composition of the present invention where A$_5$ in formula (VI) for the fourth component is a pyrimidin-2,5-diyl group, the A$_5$ is preferably oriented as shown above.

As the first component in the liquid crystal composition of the present invention, preferred are the compounds of the following formulae (Ia) and (Ib):

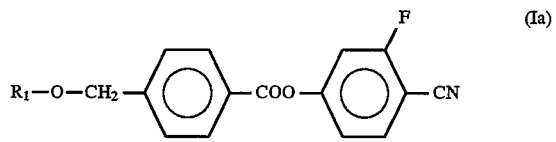

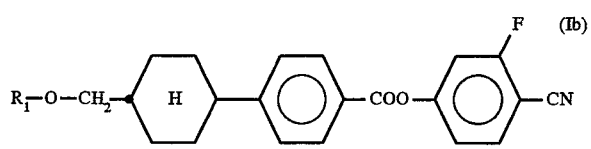

In these formulae, R$_1$ represents an alkyl group having 1 to 8 carbon atoms. These compounds are especially effective for lowering the threshold voltage and the temperature-dependence of the threshold voltage of the liquid crystal mixtures containing them. In the liquid crystal composition of the present invention, the mixing proportion of the first component is preferably 3 to 50% by weight, more preferably 5 to 30% by weight, relative to the total weight of the first to fourth components. If the mixing proportion of the first component is less than 3% by weight, the lowering of the threshold voltage of the liquid crystal composition is insufficient and the reduction in the temperature-dependence of the threshold voltage of the composition is insufficient. If so, the objects of the present invention cannot be attained. Therefore, such is unfavorable.

If, on the other hand, the mixing proportion of the first component is more than 50% by weight, the viscosity of the liquid crystal composition is too large. Therefore, such is unfavorable.

As the second component in the liquid crystal composition of the present invention, preferred are the compounds of the following formulae (IIa) and (IIb):

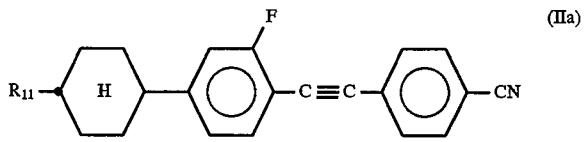

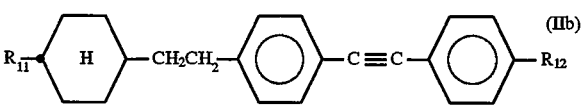

In these formulae, R$_{11}$ and R$_{12}$ each independently represent an alkyl group having 1 to 8 carbon atoms. These compounds are especially effective for elevating the clearing point of the liquid crystal mixtures containing them, for increasing the optical anisotropy and for reducing the viscosity of the same.

In the liquid crystal composition of the present invention, the mixing proportion of the second component is preferably 3 to 35% by weight, more preferably 5 to 25% by weight, relative to the total weight of the first to fourth components. If the mixing proportion of the second component is less than 3% by weight, the optical anisotropy of the liquid crystal composition cannot be enlarged sufficiently or the viscosity of the same cannot be lowered sufficiently. Therefore, such is unfavorable. If, on the other hand, the mixing proportion of the second component is more than 35% by weight, the threshold voltage of the liquid crystal composition is elevated. Therefore, such is unfavorable.

As the compound of formula (III) for the third component in the liquid crystal composition of the present invention, preferred are those of the following formulae (IIIa) to (IIIh):

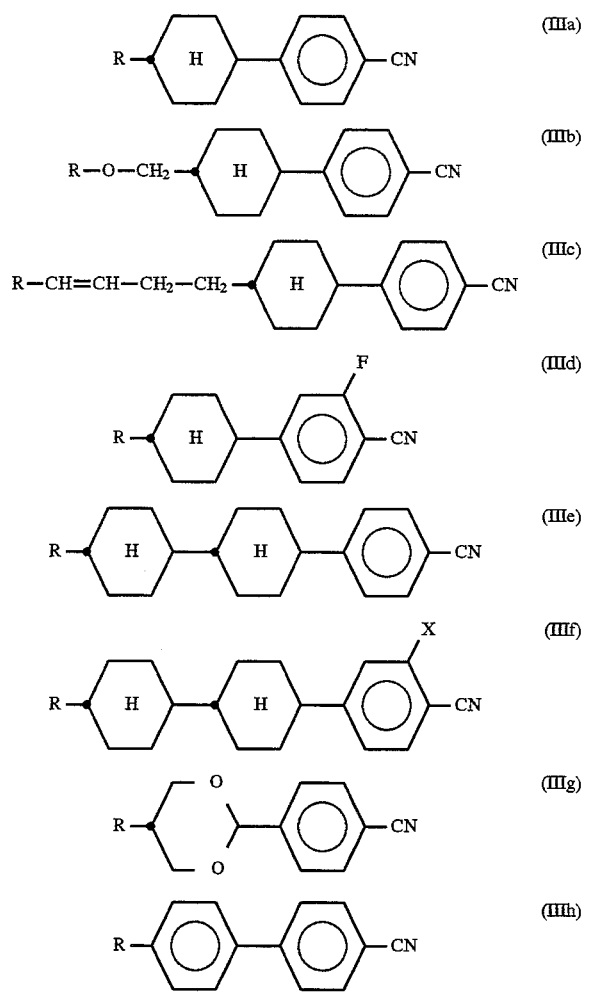

In these formulae, R represents an alkyl group having 1 to 8 carbon atoms, provided that R in formula (IIIc) may also be a hydrogen atom.

As the compound of formula (IV) for the third component in the liquid crystal composition of the present invention, preferred are those of the following formulae (IVa) to (IVo):

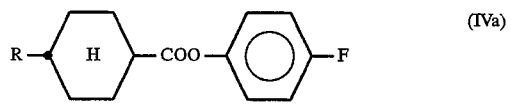

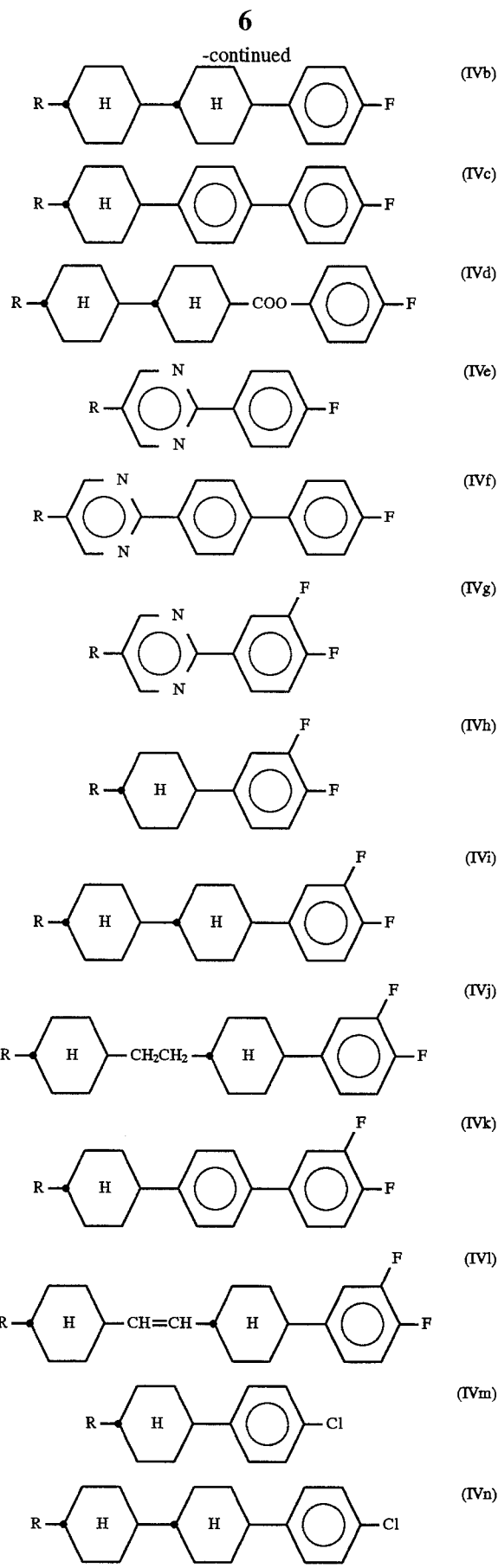

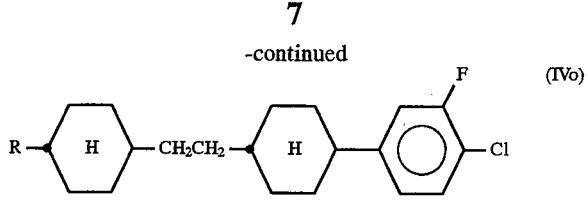

In these formulae, R represents an alkyl group having 1 to 8 carbon atoms.

As the compound of formula (V) for the third component in the liquid crystal composition of the present invention, preferred are those of the following formulae (Va) to (Vf):

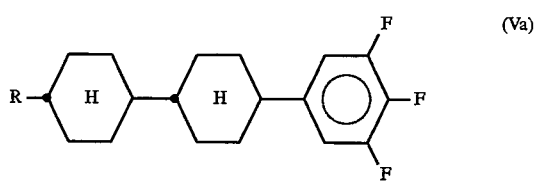

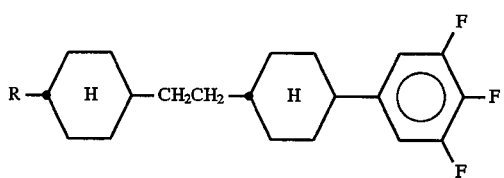

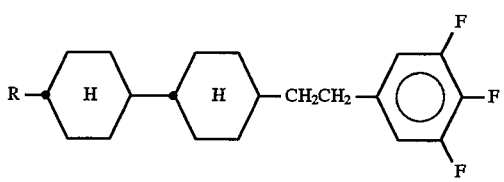

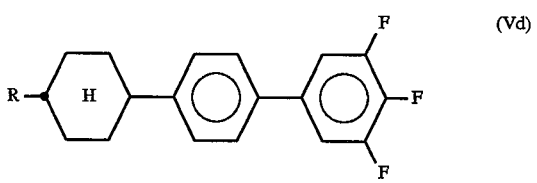

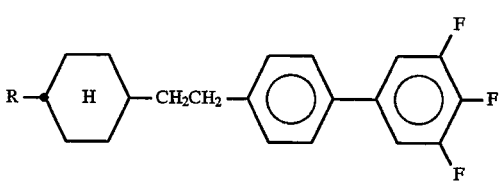

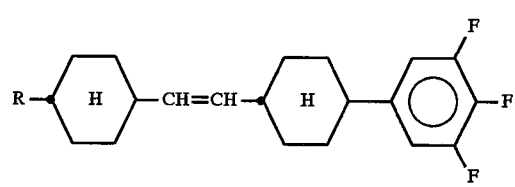

In these formulae, R represents an alkyl group having 1 to 8 carbon atoms.

The compounds of formulae (III), (IV) and (V) for the third component in the liquid crystal composition of the present invention all have a relatively large positive dielectric anisotropy and are mainly used to control the threshold voltage of the composition effectively. In the liquid crystal composition of the present invention, the mixing proportion of the third component containing one or more of the compounds of formulae (III), (IV) and (V) is preferably 10 to 60% by weight, more preferably from 15 to 40% by weight, relative to the total weight of the first to fourth components. If the mixing proportion of the third component is less than 10% by weight, the threshold voltage of the composition is not sufficiently lowered. Therefore, such is unfavorable. When the mixing proportion of the third component is more than 60% by weight, the viscosity of the composition is too large. Therefore, such is also unfavorable.

Of the compounds of formula (VI) for the fourth component in the liquid crystal composition of the present invention, preferred are those of the following general formula (VIA):

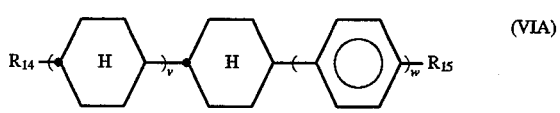

wherein $R_{14}$ represents an alkyl group having 1 to 8 carbon atoms; $R_{15}$ represents an alkyl or alkoxy group having 1 to 8 carbon atoms, or an alkoxymethyl group having 2 to 8 carbon atoms; v and w each independently represent 0 or 1, provided that when either one of v and w is 0, then the other is 1.

Of the compounds of formulae (VI) and (VII), especially preferred are those of the following formulae (VIa) to (VIh) and (VIIa):

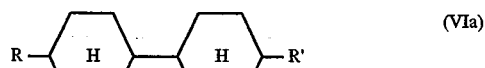

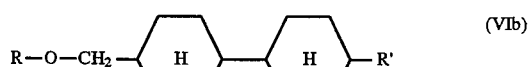

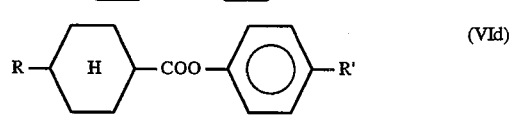

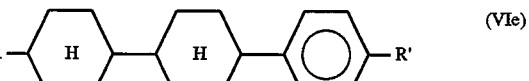

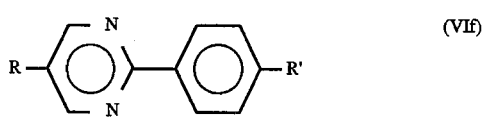

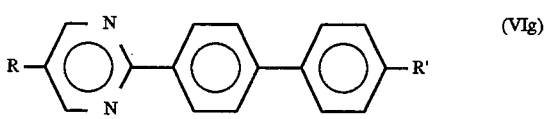

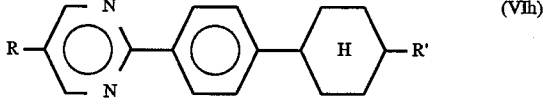

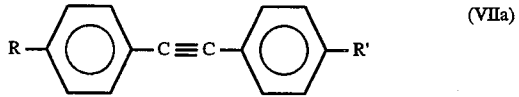

In these formulae, R represents an alkyl group having 1 to 8 carbon atoms; R' represents an alkyl or alkoxy group having 1 to 8 carbon atoms. The compounds for the fourth component in the liquid crystal composition of the present invention have a negative or weakly-positive dielectric anisotropy and are mainly used to control the clearing point, the optical anisotropy and the viscosity of the composition.

In the liquid crystal composition of the present invention, the mixing proportion of the fourth component containing one or more of the compounds of formulae (VI) and (VII) is preferably 10 to 60% by weight, more preferably 20 to 50% by weight, relative to the total weight of the first to fourth components.

If the mixing proportion of the fourth component is less than 10% by weight, the viscosity of the composition is too large. Therefore, such is unfavorable. When the mixing proportion is more than 60% by weight, the threshold voltage of the composition is elevated. Therefore, such is also unfavorable.

Preferred embodiments of the present invention are mentioned below.

(1) A liquid crystal composition comprising a first component consisting of at least one compound selected from compounds of the above-mentioned general formulae (Ia) and (Ib), a second component consisting of at least one compound selected from compounds of the above-mentioned general formulae (IIa) and (IIb), a third component consisting of at least one compound selected from compounds of the above-mentioned general formulae (IIIa) to (IIIh), (IVa) to (IVo) and (Va) to (Vg), and a fourth component consisting of at least one compound selected from compounds of the above-mentioned formulae (VIa) to (VIh) and (VIIa).

(2) A liquid crystal composition according to the above-mentioned item (1), in which the mixing proportions of the first, second, third and fourth components are 3 to 50%, 3 to 35%, 10 to 60% and 10 to 60%, respectively, all by weight relative to the total weight of these four components.

(3) A liquid crystal composition according to the above-mentioned item (1), in which the mixing proportions of the first, second, third and fourth components are 5 to 30%, 5 to 25%, 15 to 40% and 20 to 50%, respectively, all by weight relative to the total weight of these four components.

Another embodiment of the present invention is:

(4) a liquid crystal display device containing the liquid crystal composition according to any one of the above-mentioned items (1) to (3).

The compounds of formulae (I) to (VII) for use in the present invention are known or are produced according to general methods described in literatures. Therefore, anyone skilled in the art can prepare these compounds by methods that can easily be derived from the related prior art.

For instance, the compounds of formula (Ia) and the compounds of formula (Ib) are disclosed in Japanese Patent Application Laid-Open Nos. 60-184060 and 61-33519, respectively; and the compounds of formula (II) are in Japanese Patent Application Laid-Open No. 63-152334. The compounds of formula (IIIa) are disclosed in Japanese Patent Application Laid-Open Nos. 58-10552 and 59-152362; those of formula (VIa) are in Japanese Patent Application Laid-Open Nos. 59-70624 and 60-16940; those of formula (VIb) are in Japanese Patent Application Laid-Open No. 58-167535; and those of formula (VIe) are in Japanese Patent Application Laid-Open No. 57-165328.

The liquid crystal composition of the present invention can be prepared by per se known methods. In general, employable is a method of dissolving the constitutive components at temperatures higher than their clearing points.

The liquid crystal composition of the present invention may contain suitable additives, by which the composition can be modified so as to be applicable for the intended use. By such modification, the composition can be optimized for the intended use. Such additives are well known by those skilled in the art and are described in detail in literature. As one typical additive which is often used, mentioned is a chiral doping agent which induces a helical structure in the liquid crystals in the composition thereby adjusting the twist angle of the liquid crystals to a necessary value while preventing the reversed twist of the above-mentioned liquid crystals.

The liquid crystal composition of the present invention may contain dichroic dyes such as merocyanines, styryl derivatives, azo compounds, azomethines, azoxy compounds, quinophthalones, anthraquinones and tetrazine derivatives. The liquid crystal composition containing any of such dyes can be used as a material for guest-host (GH) mode devices. The liquid crystal composition of the present invention can also be used as a material for NCAP devices which are prepared by microcapsulating nematic liquid crystals and also for polymer-dispersed liquid crystal display (PDLCD) devices such as polymer-network liquid crystal display (PNLCD) devices which are prepared by forming three-dimensional network polymer structures in liquid crystals. In addition, the liquid crystal composition of the present invention can also be used as a material for electrically controlled birefringence (ECB) mode devices and dynamic scattering (DS) mode devices.

The following examples and comparative examples are not intended to restrict the scope of the present invention but are intended to more concretely describe the present invention. In the following examples, the voltage at which the transmittance has reached 10% of the saturated value is referred to as the threshold voltage and is represented by $V_{10}$. A parameter which indicates the temperature-dependence of the threshold voltage is defined by the following equation, in which the transmittance is measured in the direction of the normal to the cell surface.

$$\delta = \frac{V_{10}(0°\ C.) - V_{10}(50°\ C.)}{[V_{10}(0°\ C.) + V_{10}(50°\ C.)]/2} \times \frac{100}{50°\ C. - 0°\ C.}\ (\%/°C.)$$

COMPARATIVE EXAMPLE 1

A commercial liquid crystal product, ZLI-1132 has a clearing point of 72.4° C., a viscosity of 27.0 mPa.s at 20° C., an optical anisotropy of 0.137 at 25° C., a threshold voltage of 1.78 V, and $\delta=0.58$ (%/°C.).

EXAMPLE 1

A liquid crystal composition consisting of the following compounds was prepared.

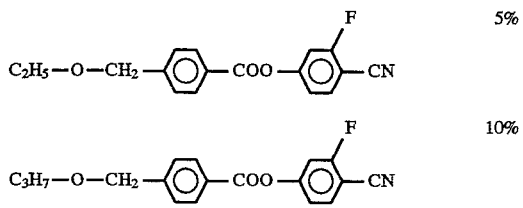

-continued

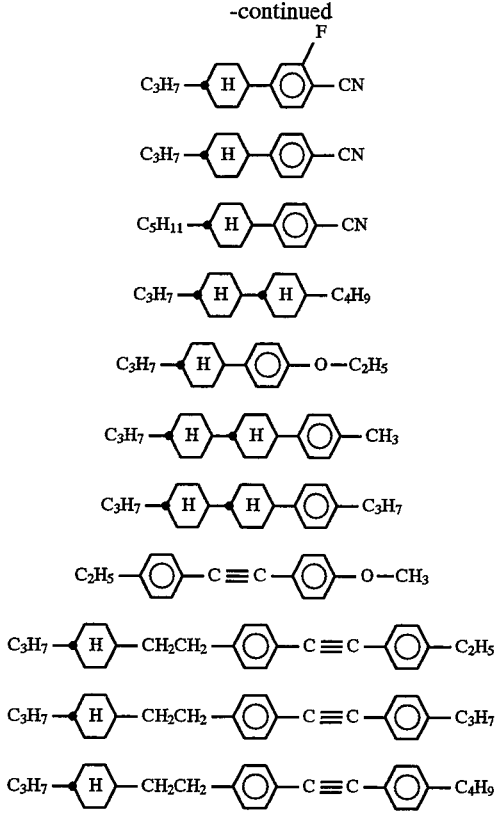

7%

14%

6%

8%

7%

10%

10%

9%

5%

5%

4%

This composition exhibited a clearing point of 73.8° C., a viscosity of 18.3 mPa.s at 20° C., an optical anisotropy of 0.139 at 25° C., and a threshold voltage of 1.53 V. The temperature-dependence of the threshold voltage of this composition was shown as δ=0.33 (%/°C.). It is known that the viscosity, the threshold voltage and δ of the liquid crystal composition of Example 1 are significantly lower than corresponding values for the liquid crystal composition of Comparative Example 1 while the optical anisotropy of the former is only slightly larger than that of the latter. From these, it is understood that the liquid crystal composition of Example 1 thus has excellent properties as a material for display devices.

EXAMPLE 2

A liquid crystal composition consisting of the following compounds was prepared.

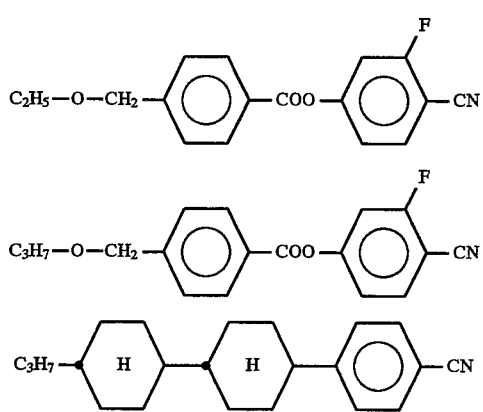

10%

10%

8%

-continued

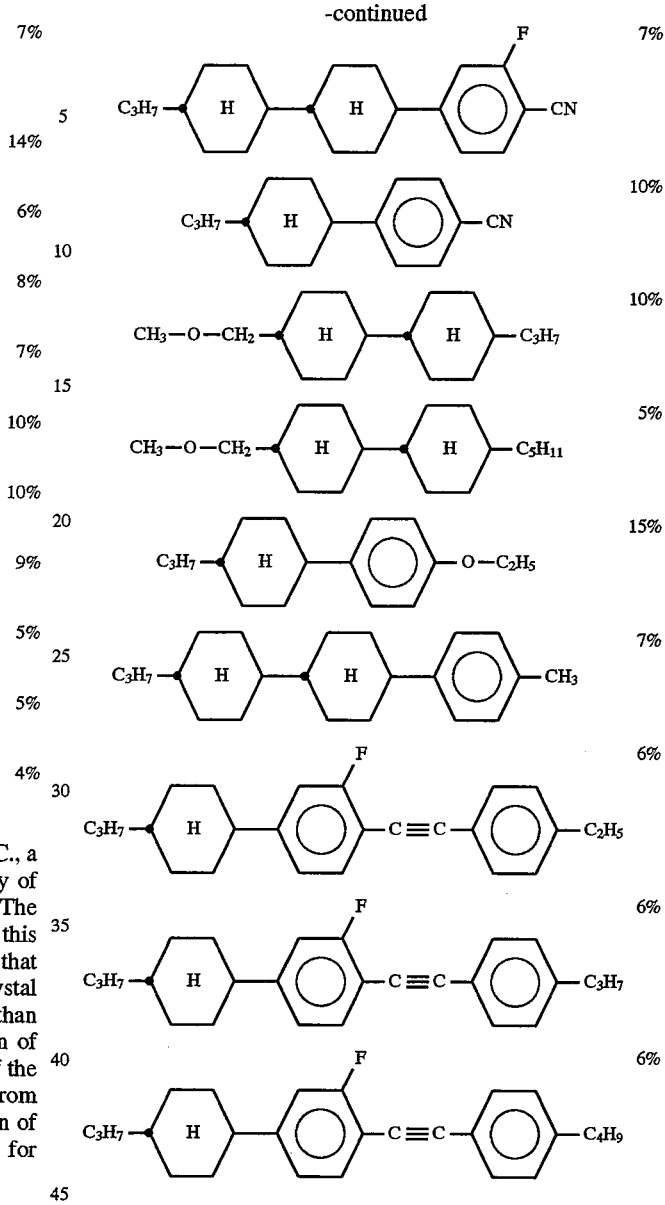

7%

10%

10%

5%

15%

7%

6%

6%

6%

This composition exhibited a clearing point of 90.7° C., a viscosity of 23.2 mPa.s at 20° C., an optical anisotropy of 0.136 at 25° C., a threshold voltage of 1.50 V, and δ=0.26 (%/°C.).

EXAMPLE 3

A liquid crystal composition consisting of the following compounds was prepared.

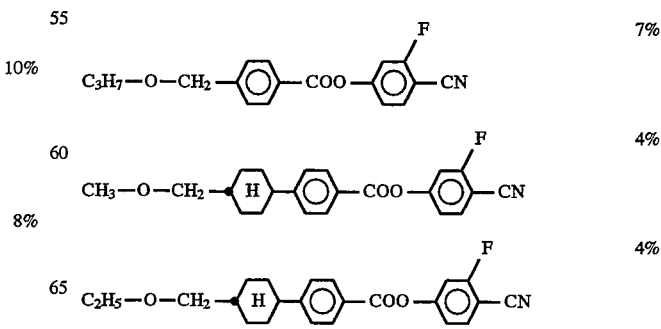

7%

4%

4%

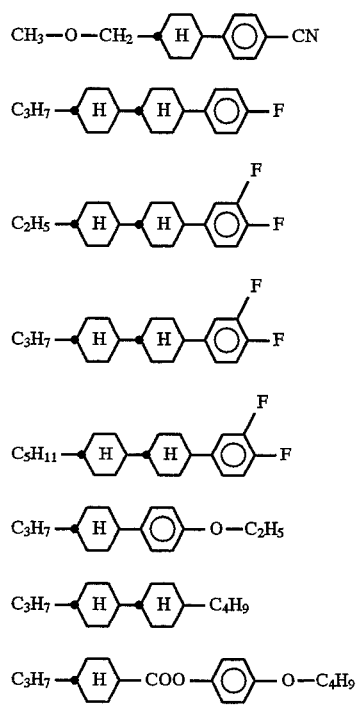
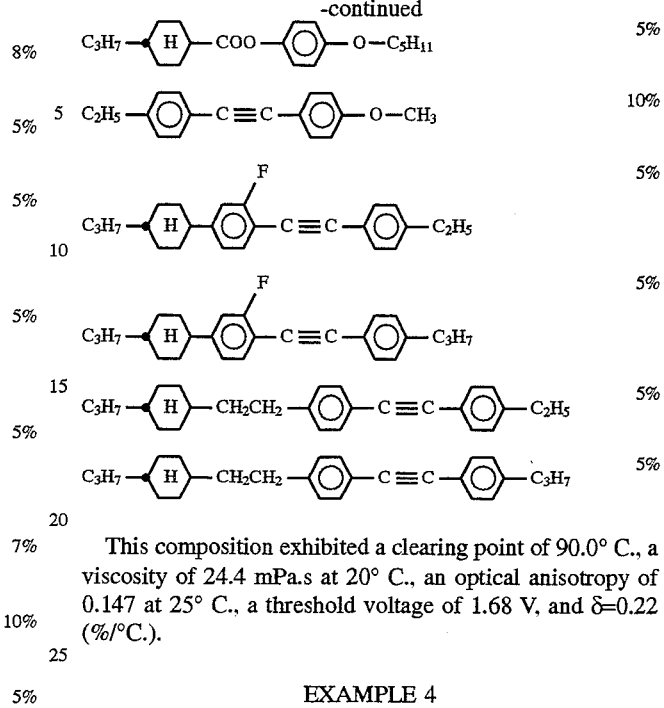
This composition exhibited a clearing point of 90.0° C., a viscosity of 24.4 mPa.s at 20° C., an optical anisotropy of 0.147 at 25° C., a threshold voltage of 1.68 V, and δ=0.22 (%/°C.).
EXAMPLE 4
A liquid crystal composition consisting of the following compounds was prepared.
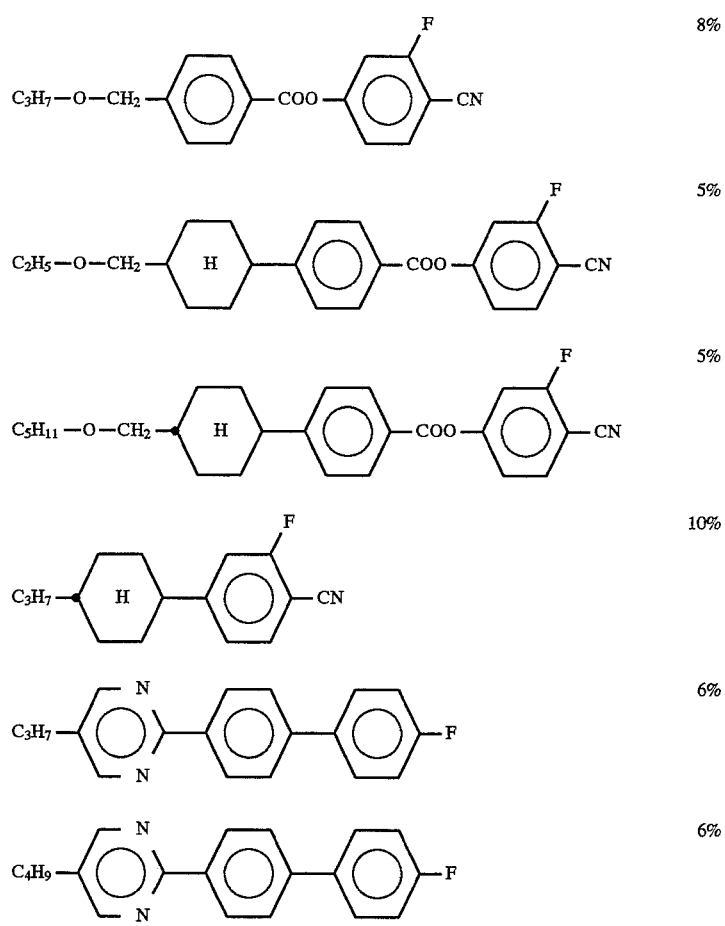

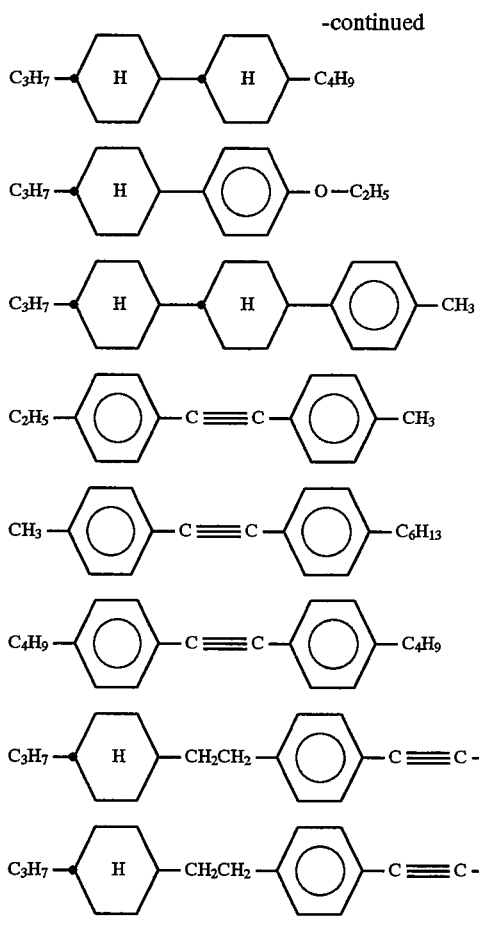
10%
6%
10%
6%
12%
6%
5%
5%
This composition exhibited a clearing point of 73.5° C., a viscosity of 25.4 mPa.s at 20° C., an optical anisotropy of 0.166 at 25° C., a threshold voltage of 1.49 V, and δ=0.38 (%/°C.).
EXAMPLE 5
A liquid crystal composition consisting of the following compounds was prepared.
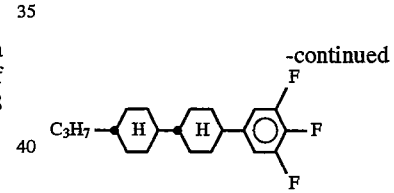
8%
8%
7%
7%
8%
4%
-continued
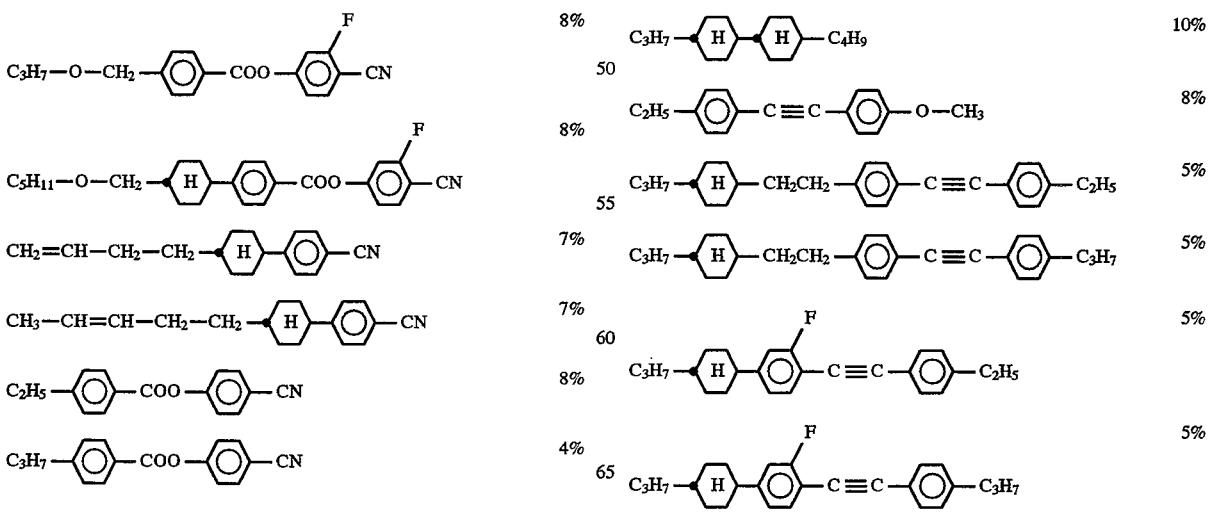
10%
5%
5%
10%
8%
5%
5%
5%
5%

This composition exhibited a clearing point of 73.4° C., a viscosity of 28.0 mPa.s at 20° C., an optical anisotropy of 0.151 at 25° C., and a threshold voltage of 1.33 V. The temperature-dependence of the threshold voltage of this composition was shown as δ=0.32 (%/°C.).
EXAMPLE 6
A liquid crystal composition consisting of the following compounds was prepared.
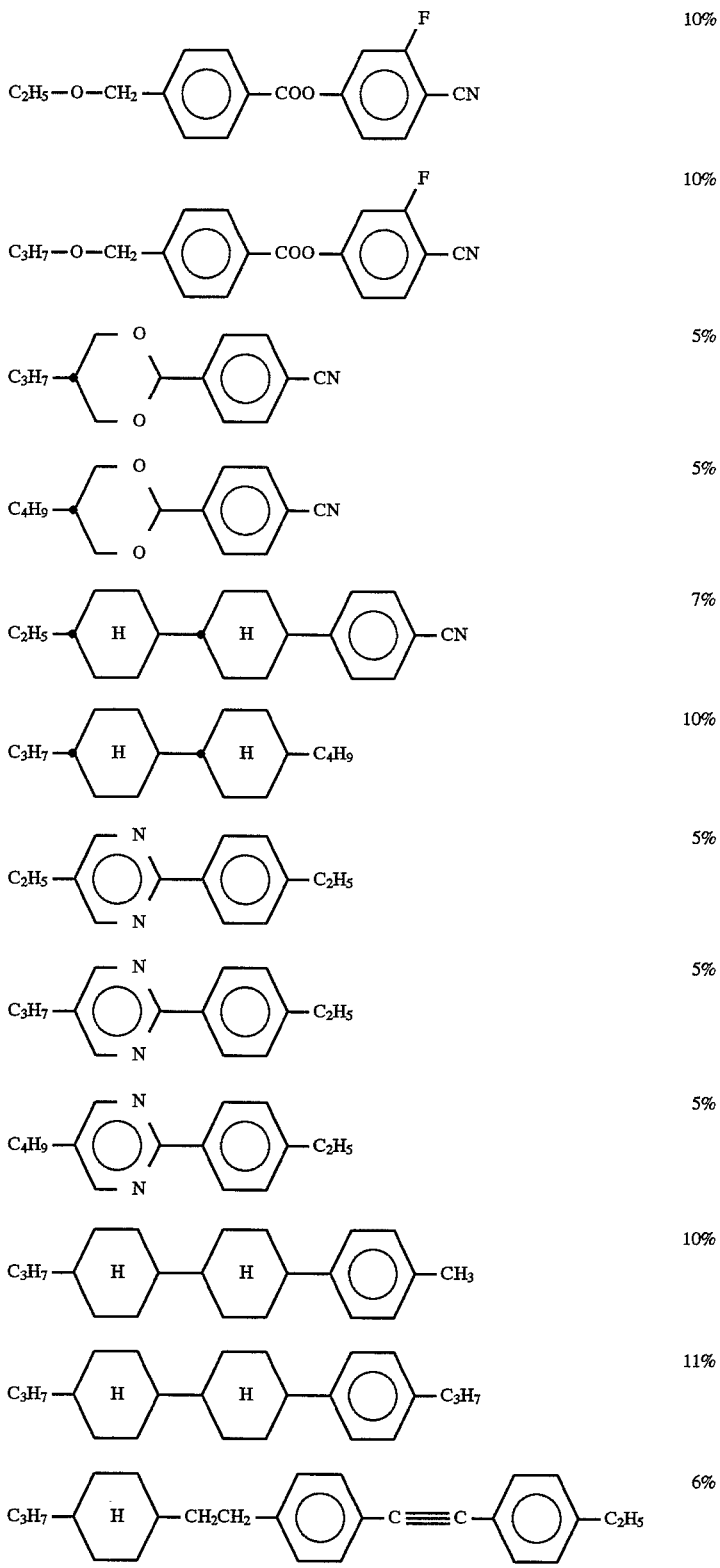

-continued
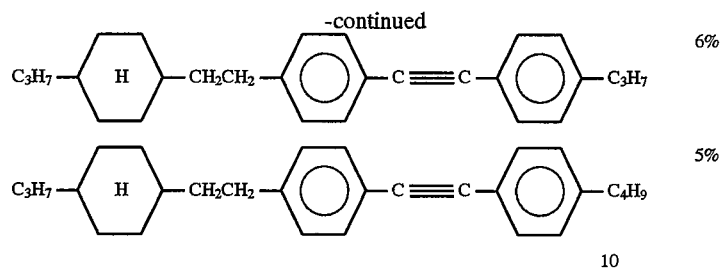
6%
5%
This composition exhibited a clearing point of 80.9° C., a viscosity of 23.1 mPa.s at 20° C., an optical anisotropy of 0.140 at 25° C., and a threshold voltage of 1.46 V.
EXAMPLE 7
A liquid crystal composition consisting of the following compounds was prepared.
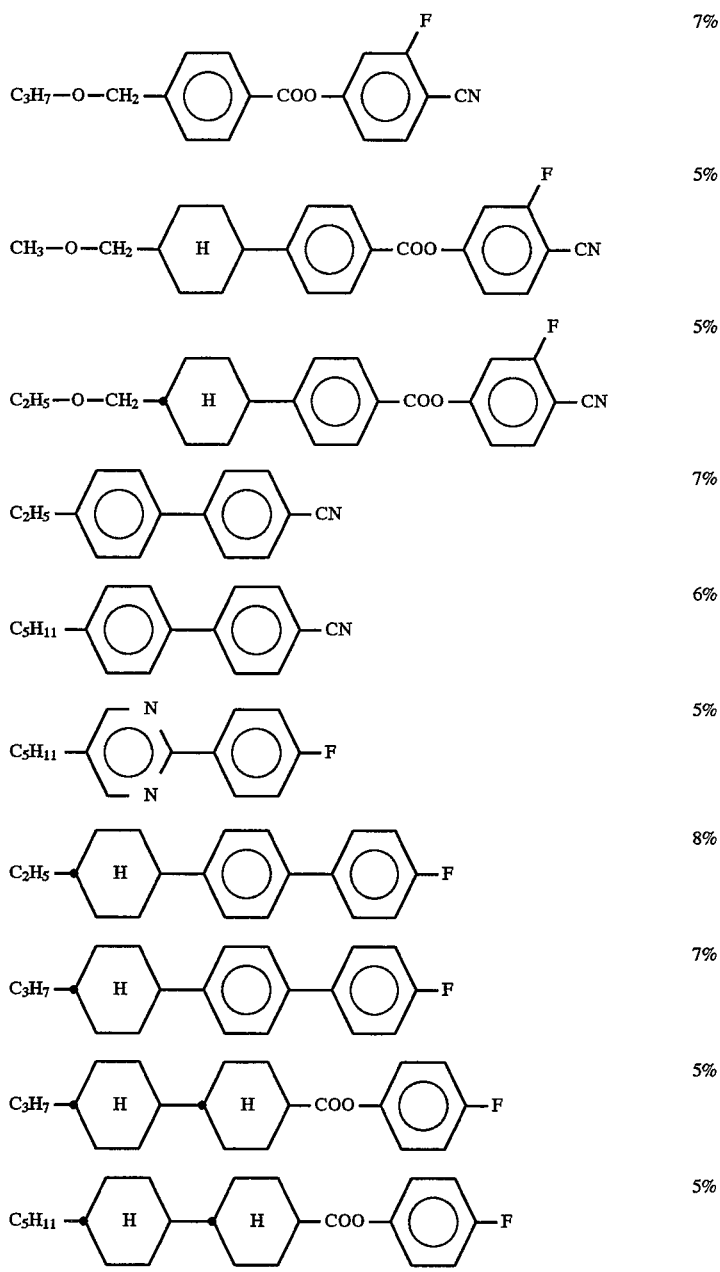
7%
5%
5%
7%
6%
5%
8%
7%
5%
5%

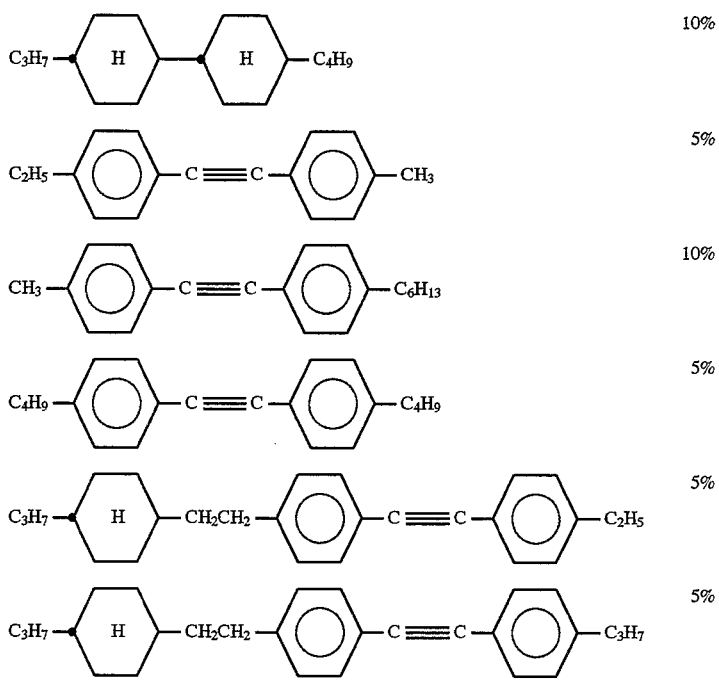

| | |
|---|---|
| | 10% |
| | 5% |
| | 10% |
| | 5% |
| | 5% |
| | 5% |

This composition exhibited a clearing point of 77.8° C., a viscosity of 26.2 mPa.s at 20° C., an optical anisotropy of 0.170 at 25° C., and a threshold voltage of 1.51 V.

As is obvious from the comparative example and examples mentioned above, the liquid crystal compositions of the present invention all have a reduced threshold voltage with reduced temperature-dependence while having a suitably elevated optical anisotropy and a reduced viscosity. Using these compositions, therefore, it is possible to realize liquid crystal display devices that satisfy the requirements for practical use, namely the low-voltage driving ability, the reduced temperature-dependence and the high-speed electro-optical response.

While the invention has been described in detail and with reference to specific embodiments thereof, it will be apparent to one skilled in the art that various changes and modifications can be made therein without departing from the spirit and scope thereof.

What is claimed is:

1. A liquid crystal composition comprising a first component consisting of at least one compound selected from compounds of the following general formula (I), a second component consisting of at least one compound selected from compounds of the following general formula (II), a third component consisting of at least one compound selected from compounds of the following general formulae (III) to (V), and a fourth component consisting of at least one compound selected from compounds of the following general formulae (VI) and (VII):

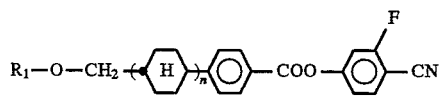 (I)

wherein $R_1$ represents an alkyl group having 1 to 8 carbon atoms; n represents 0 or 1;

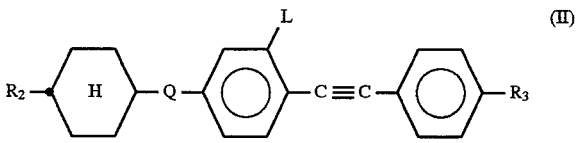 (II)

wherein $R_2$ and $R_3$ each independently represent an alkyl group having 1 to 8 carbon atoms; L represents F or H; Q represents —$CH_2CH_2$— or a single bond;

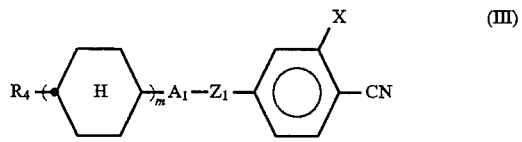 (III)

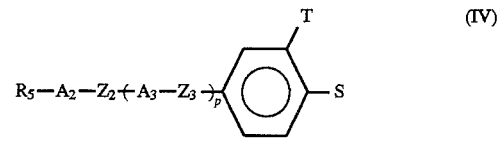 (IV)

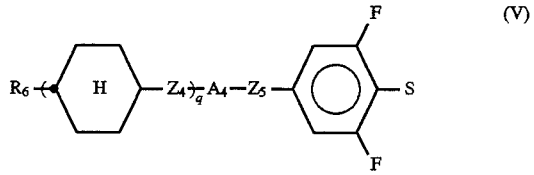 (V)

wherein in formula (III), $R_4$ represents an alkyl group having 1 to 8 carbon atoms, in which one $CH_2$ may be substituted by an oxygen atom or —CH=CH—; m represents 0 or 1; $A_1$ represents a trans-1,4-cyclohexylene, 1,4-phenylene or trans-1, 3-dioxan-2,5-diyl group; $Z_1$ represents —COO— or a single bond; X represents F or H, provided that when $Z_1$ is —COO—, then X is H;

in formula (IV), $R_5$ represents an alkyl group having 1 to 8 carbon atoms; p represents 0 or 1; $A_2$ represents a trans -1,4-cyclohexylene, 1,4-phenylene or pyrimidin-2,5-diyl group; $A_3$ represents a trans-1,4-cyclohexylene or 1, 4-phenylene group; $Z_2$ represents —$CH_2CH_2$—, —CH=CH— or a single bond; $Z_3$ represents —COO— or a single bond; T represents F or H; S represents F or Cl; in formula (V), $R_6$ represents an alkyl group having 1 to 8 carbon atoms; q represents 0 or 1; $A_4$ represents a trans-1,4-cyclohexylene or 1,4-phenylene group; $Z_4$ represents —$CH_2CH_2$—, —CH=CH— or a single bond; $Z_5$ represents —$CH_2CH_2$— or a single bond; S represents F or Cl;

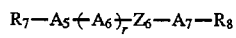 (VI)

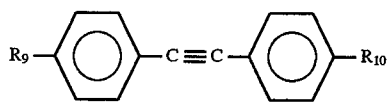 (VII)

wherein in formula (VI), $R_7$ represents an alkyl group having 1 to 8 carbon atoms; $R_8$ represents an alkyl or alkoxy group having 1 to 8 carbon atoms or an alkoxymethyl group having 2 to 8 carbon atoms; r represents 0 or 1; $A_5$ represents a trans-1,4cyclohexylene, 1,4-phenylene or pyrimidin-2,5-diyl group; $A_6$ and $A_7$ each independently represent a trans-1,4-cyclohexylene or 1,4-phenylene group; $Z_6$ represents —COO— or a single bond;

in formula (VII), $R_9$ represents an alkyl group having 1 to 8 carbon atoms; $R_{10}$ represents an alkyl or alkoxy group having 1 to 8 carbon atoms.

2. A liquid crystal composition as claimed in claim 1, in which said second component consists of at least one compound selected from compounds of general formulae (IIa) and (IIb):

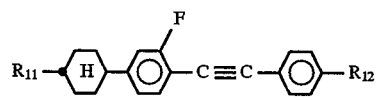 (IIa)

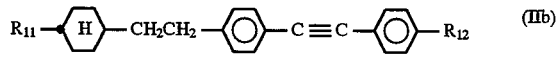 (IIb)

wherein $R_{11}$ and $R_{12}$ each independently represent an alkyl group having 1 to 8 carbon atoms.

3. A liquid crystal composition as claimed in claim 1, in which said compound of formula (III) is at least one compound of a general formula (IIIA):

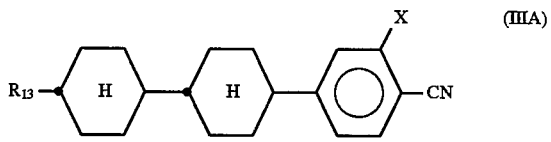 (IIIA)

wherein $R_{13}$ represents an alkyl group having 1 to 8 carbon atoms; X represents F or H.

4. A liquid crystal composition as claimed in claim 1, in which said compound of formula (VI) is at least one compound of a general formula (VIA):

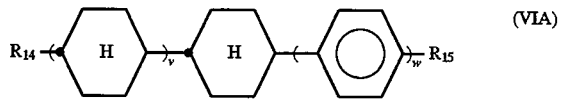 (VIA)

wherein $R_{14}$ represents an alkyl group having 1 to 8 carbon atoms; $R_{15}$ represents an alkyl or alkoxy group having 1 to 8 carbon atoms, or an alkoxymethyl group having 2 to 8 carbon atoms; v and w each independently represent 0 or 1, provided that when either one of v and w is 0, then the other is 1.

5. A liquid crystal composition as claimed in claim 2, in which said compound of formula (III) is at least one compound of a general formula (IIIA):

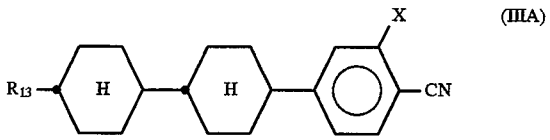 (IIIA)

wherein $R_{13}$ represents an alkyl group having 1 to 8 carbon atoms; X represents F or H.

6. A liquid crystal composition as claimed in claim 2, in which said compound of formula (VI) is at least one compound of a general formula (VIA):

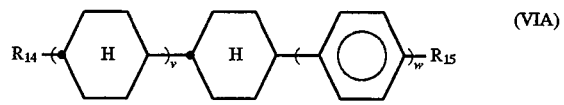 (VIA)

wherein $R_{14}$ represents an alkyl group having 1 to 8 carbon atoms; $R_{15}$ represents an alkyl or alkoxy group having 1 to 8 carbon atoms, or an alkoxymethyl group having 2 to 8 carbon atoms; v and w each independently represent 0 or 1, provided that when either one of v and w is 0, then the other is 1.

7. A liquid crystal composition as claimed in claim 3, in which said compound of formula (VI) is at least one compound of a general formula (VIA):

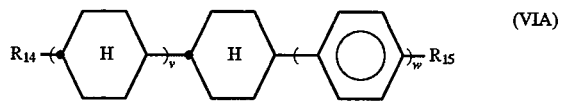 (VIA)

wherein $R_{14}$ represents an alkyl group having 1 to 8 carbon atoms; $R_{15}$ represents an alkyl or alkoxy group having 1 to 8 carbon atoms, or an alkoxymethyl group having 2 to 8 carbon atoms; v and w each independently represent 0 or 1, provided that when either one of v and w is 0, then the other is 1.

8. A liquid crystal composition as claimed in claim 5, in which said compound of formula (VI) is at least one compound of a general formula (VIA):

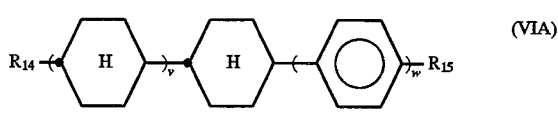 (VIA)

wherein $R_{14}$ represents an alkyl group having 1 to 8 carbon atoms; $R_{15}$ represents an alkyl or alkoxy group having 1 to 8 carbon atoms, or an alkoxymethyl group having 2 to 8 carbon atoms; v and w each independently represent 0 or 1, provided that when either one of v and w is 0, then the other is 1.

9. A liquid crystal composition as claimed in claim 1 in which the mixing proportions of the first, second, third and fourth components are, by weight, 3 to 50%, 3 to 35%, 10 to 60% and 10 to 60%, respectively, relative to the total weight of said four components.

10. A liquid crystal composition as claimed in claim 1, in which the mixing proportions of the first, second, third and fourth components are, by weight, 5 to 30%, 5 to 25%, 15 to 40% and 20 to 50%, respectively, relative to the total weight of said four components.

11. A liquid crystal composition as claimed in claim 2, in which the mixing proportions of the first, second, third and fourth components are, by weight, 3 to 50%, 3 to 35%, 10 to 60% and 10 to 60%, respectively, relative to the total weight of said four components.

12. A liquid crystal composition as claimed in claim 2, in which the mixing proportions of the first, second, third and fourth components are, by weight, 5 to 30%, 5 to 25%, 15 to 40% and 20 to 50%, respectively, relative to the total weight of said four components.

13. An electro-optical display device employing a liquid crystal composition as set forth in claim 1.

* * * * *